US012812075B2

(12) United States Patent

Garnier et al.

(10) Patent No.: US 12,812,075 B2
(45) Date of Patent: Nov. 24, 2026

(54) MULTI-SIDED PROJECTION SYSTEM

(71) Applicant: Universal City Studios LLC, Universal City, CA (US)

(72) Inventors: Timothy Garnier, Orlando, FL (US); Akiva Krauthamer, Orlando, FL (US); Aaron Jeromin, Orlando, FL (US); Eric Boxer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/642,194

(22) Filed: Apr. 22, 2024

(65) Prior Publication Data

US 2025/0330559 A1 Oct. 23, 2025

(51) Int. Cl.
*H04N 9/31* (2006.01)

(52) U.S. Cl.
CPC ......... *H04N 9/3147* (2013.01); *H04N 9/3152* (2013.01)

(58) Field of Classification Search
CPC ........................... H04N 9/3147; H04N 9/3152
See application file for complete search history.

(56) References Cited

U.S. PATENT DOCUMENTS 4,973,951 A 11/1990 Shigeta et al.
5,357,355 A 10/1994 Arai
5,856,819 A 1/1999 Vossler
9,827,719 B2 11/2017 Kautz et al.
10,520,782 B2 12/2019 Busch
11,158,220 B2 10/2021 Garnier et al.
2006/0012876 A1* 1/2006 Choi .................... G03B 21/625 359/452
2006/0187140 A1 8/2006 Brask
2006/0214880 A1 9/2006 Moore
2010/0299982 A1* 12/2010 Yu ........................... G09F 9/305 362/559
2014/0362348 A1* 12/2014 Joseph ..................... G02B 6/08 264/1.24
2016/0307227 A1* 10/2016 Li ...................... G06Q 30/0242
2016/0322007 A1* 11/2016 Kim ......................... G09G 3/36
(Continued)

FOREIGN PATENT DOCUMENTS

JP 59190036 A * 10/1984
JP H0720320 A * 1/1995
JP 2002139798 A * 5/2002
(Continued)

OTHER PUBLICATIONS

PCT/US2025/023653 International Search Report and Written Opinion mailed Jul. 23, 2025.

*Primary Examiner* — Michael Lee
(74) *Attorney, Agent, or Firm* — Fletcher Yoder, PC

(57) ABSTRACT

A projection system for an entertainment venue includes a display having a first display surface and a second display surface, a light transmission system comprising a plurality of light transmitters extending between the first display surface and the second display surface, and an image source configured to project imagery onto the first display surface for reflection by the first display surface, wherein each of the plurality of light transmitters is configured to direct light associated with the imagery projected onto the first display surface to the second display surface.

20 Claims, 4 Drawing Sheets

(56) References Cited

U.S. PATENT DOCUMENTS

| | | | |
|---|---|---|---|
| 2024/0066425 | A1 | 2/2024 | Tripp et al. |

FOREIGN PATENT DOCUMENTS

| | | | | |
|---|---|---|---|---|
| JP | 2003057757 | A | | 2/2003 |
| TW | M487456 | U | * | 10/2014 |
| TW | I622031 | B | * | 4/2018 |
| WO | 2022216913 | A1 | | 10/2022 |

* cited by examiner

MULTI-SIDED PROJECTION SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks have substantially grown in popularity, and an increasing amount of people visit amusement park attractions. Further, an increasing number of amusement park attractions have utilized projection systems that provide immersive experiences to guests within the amusement parks. The projection systems may employ various components to provide visual, audio, and/or haptic feedback to guests within the amusement park. It is now recognized that it may be desirable to incorporate additional components and/or features into existing projection systems to provide additional services and features, thereby improving a guest experience within the amusement park.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a projection system for an entertainment venue includes a display having a first display surface and a second display surface, a light transmission system comprising a plurality of light transmitters extending between the first display surface and the second display surface, and an image source configured to project imagery onto the first display surface for reflection by the first display surface, wherein each of the plurality of light transmitters is configured to direct light associated with the imagery projected onto the first display surface to the second display surface.

In an embodiment, a system for an amusement park includes a projector configured to project imagery, a first display surface configured to receive the imagery projected by the projector and at least partially reflect the imagery, a second display surface, and a plurality of light transmitters extending between the first display surface and the second display surface and arranged in a woven arrangement. Each of the plurality of light transmitters includes a first end positioned proximate the first display surface, a second end positioned proximate the second display surface, and a body extending between the first end and the second end, wherein the first end is configured to receive light associated with the imagery projected onto the first display surface, the body is configured to direct the light toward the second end, and the second end is configured to present the light via the second display surface.

In an embodiment, a multi-sided projection system for an amusement park includes a display positioned within a guest area and including a first display surface, a second display surface and a plurality of light transmitters extending between the first display surface and the second display surface, wherein the plurality of light transmitters is configured to transmit light received via the first display surface out of the second display surface. The multi-sided projection system also includes an image source configured to project imagery onto the first display surface, one or more sensors configured to detect data indicative of one or more parameters of the guest area, and a controller configured to control the display to change the imagery based on the data from the one or more sensors.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
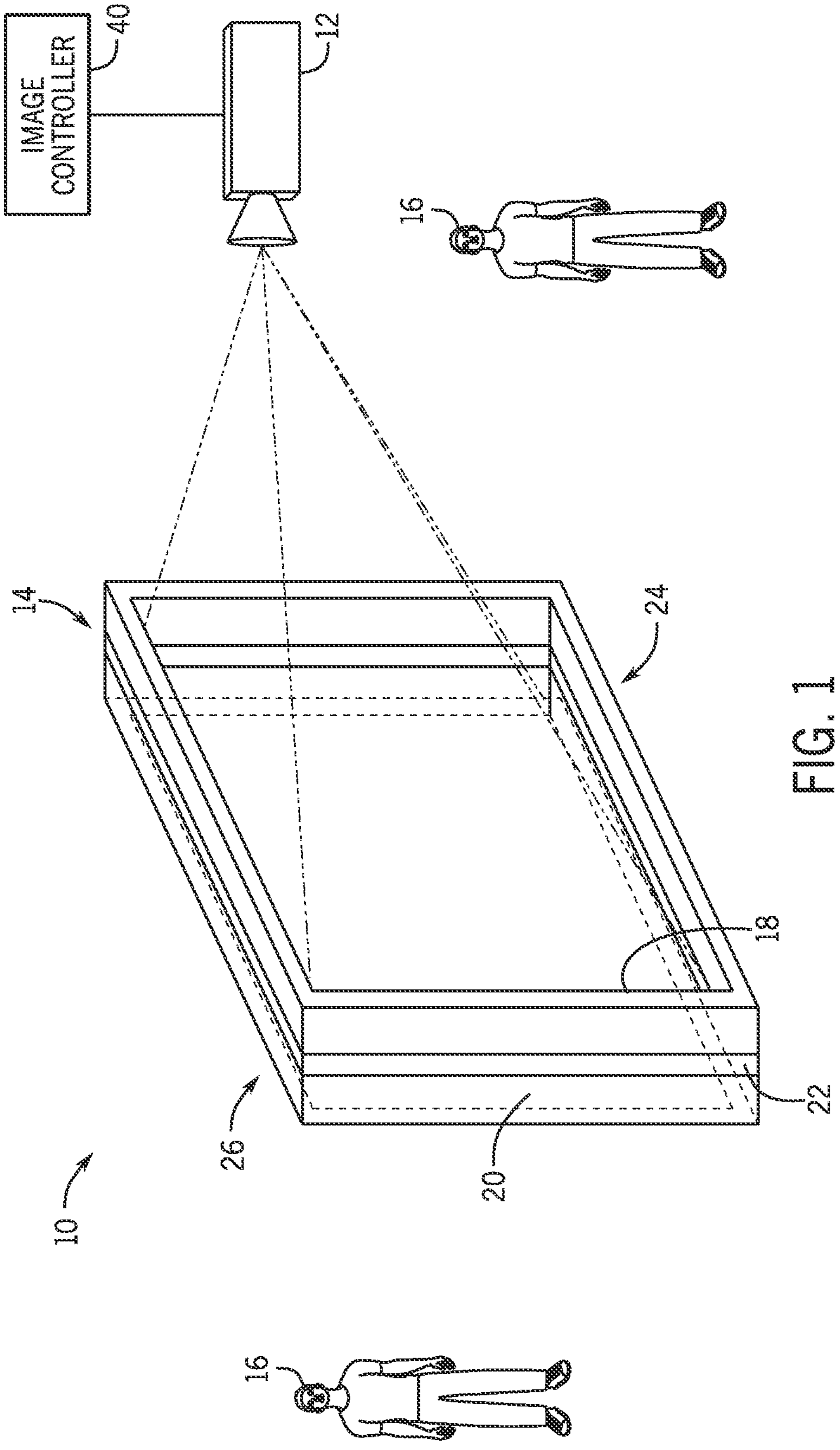
FIG. 1 is a schematic perspective view of an embodiment of an amusement park system with a show effect system operable to present imagery, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to a projection system for use in an entertainment venue, such as an amusement park, and may be utilized in conjunction with various attraction systems. For example, amusement parks may include rides, attractions, or entertainment areas (e.g., walkways, dining area, souvenir shops, arcade centers, and so forth) that provide an immersive experience for park guests. As part of the experience, such rides, attractions, and/or entertainment areas may employ projection systems that operate to present various special effects, such as visual effects, to the guests via a display. For example, the projection systems may present visual effects related to an aspect of an attraction (e.g., video associated with an attraction, character associated with an attraction) to entertain the guests experiencing the attraction.

Additionally, or alternatively, the projection systems may present visual effects that provide information to guests within the amusement park. For example, the projection systems may be located proximate a pathway or walkway within the amusement park, and the display of the projection system may provide directional information, capacity information, queue time information, and the like associated with one or more attractions of the amusement park. Further still, the projection systems may present visual effects related to an entertainment area. For example, the projection systems may provide visual imagery indicative of a cost of a particular attraction (e.g., cost of food and/or beverage at a restaurant, cost of a rental), a scoreboard for a particular attraction, and the like. It should be appreciated that the examples above are not intended to be limiting, and the projections systems discussed herein may be utilized to present visual effects associated with any aspect of an amusement park.

The present techniques improve upon certain types of existing projection systems. For example, traditional projection systems may include a display and a light source that projects visual effects onto a single surface of the display. Because traditional projection systems utilize a single display surface, it may be difficult to determine a location for the display surface that optimizes and/or increases viewership of the visual effects presented by the display system. For example, guests of the amusement park may approach the display surface from different directions and/or angles, thereby providing the guests with different viewpoints relative to the display surface.

Unfortunately, in certain cases, guests may be precluded from viewing the display surface due to their viewpoint. For example, consider a scenario in which a display of a projection system is positioned proximate a walkway of the amusement park that extends in a north to south direction, and the display extends cross-wise relative to a direction of travel along the walkway. The display may include a single display surface facing to the north and a rear surface that does not present imagery facing to the south. Thus, guests approaching from the north side of the display may be capable of viewing an image projected onto the display surface, while guests approaching from the south side of the display are only capable of viewing the rear surface that does not present imagery. Alternatively, where the display surface is translucent, a reversed version of the projected image may be observed, which may be undesirable, especially when text is involved. As such, it is now recognized that it may be beneficial to provide visual imagery on multiple sides (e.g., multiple surfaces, on both a northerly facing surface and a southerly facing surface) of the display using a single image source (e.g., a single projection source), thereby enabling guests from different directions to view the imagery presented by the projection system. Presently disclosed embodiments create efficiency by using a single projector for image depictions on multiple surfaces, including surfaces that cannot traditionally be reached by a single projector. Further, presently disclosed embodiments allow for image modification between surfaces, which can add to efficiency and create interest in observers.

The present disclosure is directed toward a projection system that includes a single image source (e.g., a projector) and a display (e.g., screen, fabric, film) that includes two or more display surfaces. The projection system may also include a light transmission system (e.g., fiber optic weave, acrylic light pipe system, glass fiber pipe system) disposed within the display that includes a plurality of light transmitters (e.g., tubes, pipes, fibers) extending between each of the display surfaces, thereby enabling each of the display surfaces to present desired visual imagery on each surface of the display. For example, each of the light transmitters may include an end (a first end) positioned adjacent a display surface, an opposing end (a second end) positioned adjacent an opposing display surface, and a body extending between the ends. The image source may transmit or project an image onto one of the display surfaces, and the light transmitters positioned adjacent the display surface directly receiving the projected image may receive the light associated with the projected imagery and direct the light through the body toward the other end of the respective light transmitter, thereby enabling the other display surface to present the projected imagery.

In certain embodiments, the light transmitters may be oriented and/or configured between the display surfaces of the display such that desirable imagery is presented on each of the display surfaces employed by the display. As discussed herein, “desirable imagery” may refer to imagery that is oriented in a way that is presented in a desired manner (e.g., a legible and/or perceivable manner) from each of the display surfaces of the display. That is, the light transmitters may be oriented and/or configured (e.g., woven between the display surfaces) such that the imagery presented on each of the display surfaces is not mirrored, and instead, is presented in a desirable (e.g., legible, perceivable) manner. For example, as noted above, each of the light transmitters employed by the light transmission system may include an end that terminates at and/or is positioned proximate a display surface of a display and another end that terminates at and/or is positioned proximate a different (e.g., an opposing) display surface of the display. Each of the ends of each light transmitter may be positioned at a desired location relative to the respective display surface associated with the end of the light transmitter, thereby enabling desirable imagery projected from a single image source to be displayed on each surface of the display. For example, a first light transmitter may include a first end that terminates at an upper left portion of a first display surface (e.g., relative to a guest viewing the first display surface) and a body of the first light transmitter may extend between the display surfaces such that a second end of the first light transmitter terminates at an upper left portion of the second display surface (e.g., relative to a different guest viewing the second display surface). Thus, imagery projected into the upper left portion of the first display surface may be presented on the first display surface and may simultaneously be transmitted through the first light transmitter to be displayed on the second display surface. However, because the body of the first light transmitter is oriented such that the second end of the first light transmitter terminates at the upper left portion of the second display surface, the imagery may be presented on the second display surface as though it is being projected onto the upper left portion of the second display surface.

As an example, upon projecting imagery including text onto a first display surface of a display, the first display surface may display the projected imagery. The light associated with the projected imagery may be transmitted through the transmitters of the light transmission system, and the second display surface may present the imagery such that the text is presented in a legible manner (e.g., not mirrored). In this way, desirable imagery may be presented to guests having different viewpoints of each of the respective display surfaces employed by the display. Additionally, or alternatively, the light transmitters may be oriented such that the imagery presented on one display surface is different in one or more aspects relative to the imagery projected onto a connected display surface, which is connected by the light transmitters. For example, in certain embodiments, the light transmitters of the light transmission system may be oriented and/or configured such that imagery projected onto a first display surface is flipped and/or rotated in a particular direction when presented on a second display surface, the imagery is scaled to a different size when presented on the second display surface, the imagery is presented in a different shape on the second display surface, and the like. In this way, desirable imagery may be presented on multiple surfaces of a display while only using a single image source.

Additionally, in certain embodiments, each of the display surfaces may include a semi-opaque and/or tined projection material (e.g., surface) that may improve visual effects projection onto the display surfaces. For example, certain materials may be incorporated into each of the display surfaces that enhance color or contrast and/or improve diffusion of the light, thereby rendering projected imagery in a clearer fashion. It should be appreciated that the double-sided projection systems discussed herein may provide other advantages and/or improvements, as discussed in greater detail below. Further, while the present techniques are discussed in the context of amusement or theme parks, it should be understood that the disclosed embodiments may also be applicable to other environments, such as entertainment venues or retail spaces.

With the preceding in mind, FIG. 1 illustrates a schematic view of an embodiment of a double-sided projection system (DSPS) 10 providing imagery on each of the display surfaces employed by the DSPS 10. The DSPS 10 is an example of a multi-sided projection system in accordance with present embodiments. Where more than two sides are employed, split light transmitters or redirected portions of a plurality of light transmitters may be employed. For example, a single light transmitter may be forked to supply light from a projection surface to two different emitter surfaces or select ratios of light emitters may connect to the separate emitter surfaces, which may reduce intensity of transmitted light. The DSPS 10 may be disposed within an attraction, such as a ride, a walk-through attraction, a stationary attraction, an entertainment area (e.g., souvenir shop, restaurant, arcade area), disposed proximate a walkway or pathway of an amusement, or disposed at any other suitable location within a theme or amusement park. The DSPS 10 includes an image source 12 (e.g., single image source, projector) and a display 14, and the image source 12 may be configured to project imagery onto a surface of the display 14 for viewing by a guest 16 (e.g., viewer) of an attraction. In certain embodiments, the display 14 may include a first display surface 18 and a second display surface 20 each configured to present imagery to a guest 16 based on imagery that has been projected by the image source 14. While a traditional projection surface may not allow for imagery to be depicted on both the first display surface 18 and the second display surface 20, the illustrated embodiment includes a system for transmitting light between the two. For example, the DSPS 10 may include a light transmission system 22 disposed within the display 14, and the light transmission system 22 may include a plurality of light transmitters configured to transmit light that has been projected onto one of the display surfaces 18, 20 of the display 14, as discussed in greater detail below. In this way, the light transmitters of the light transmission system 22 may enable light associated with an image projected onto the first display surface 18 to be transmitted through the light transmitters of the light transmission system 22 and displayed on the second display surface 20. Further, the projected image may be modified through routing aspects of the transmission system 22, as discussed in greater detail below.

For example, the display 14 may include a first viewer side 24 associated with the first display surface 18 and a second viewer side 26 associated with the second display surface 20. In the illustrated embodiment, the image source 12 is positioned proximate the first viewer side 24, and thus, may be configured to project imagery onto the first display surface 18. To present the imagery on the second display surface 20, a first end of each of the light transmitters associated with the first display surface 18 may receive the projected imagery and may transmit the light associated with the projected imagery therethrough, via the light transmission system 22, to a second end of the respective light transmitter associated with the second display surface 20. Thus, guests 16 positioned on the second viewer side 26 may view the imagery via the second display surface 20 based on the light transmission system 22 transmitting the imagery projected onto the first display surface 18 through the light transmitters of the light transmission system 22. It should be appreciated that the image source 12 may be positioned in any suitable location that enables imagery to be projected onto one of the display surfaces 18, 20 of the display 14 and transmitted through the light transmission system 22 for viewing on a display surface that does not directly receive the projected imagery. For example, in certain embodiments, the image source 12 may be positioned on the second viewer side 26 and thus may project imagery onto the second display surface 20. In turn, the light transmission system 22 may transmit the projected imagery through the light transmitters for viewing on the first display surface 18.

To more accurately display various imagery, in certain embodiments, the DSPS 10 may include one or more image sources 12 mounted on a mechanism that enables the image source(s) 12 to be moved. The multiple image sources 12 and/or the mechanism on which the image sources 12 may be mounted may be communicatively coupled to a controller of the DSPS 10 such that the location of the light sources (e.g., a light bulb or other light source of the image source 12) associated with the image source(s) 12 may be controlled in conjunction with the projected imagery or image sequence. Thus, the angle of light (e.g., projection) projected onto a display surface 18, 20 may be varied to simulate a change in the location of the light source at different times during a day. Additionally, or alternatively, the light color of the projection may be varied to simulate a change in the light source at different times during the day. In certain embodiments, the visual imagery to be projected onto one of the display surfaces 18, 20 may be processed via an image controller 40 of the DSPS 10 that is in communication with the image source 12. That is, the visual imagery or image sequence may be processed and/or rendered by the image controller 40 to provide desired imagery on each of the display surfaces 18, 20 employed by the DSPS 10. For example, in certain embodiments, the image controller 40 may be configured to process and/or render an image to be projected such that color saturation may be added to the image. In this way, colors presented on the display surfaces 18, 20 may be bright in instances where some color saturation may be lost when the image is projected onto one of the display surfaces 18, 20. These processing techniques may provide clearer, more accurate, and/or more realistic imagery presented via the DSPS 10, and thus, may provide a more enjoyable experience for the guests 16, as discussed in greater detail below.

Figure 2:
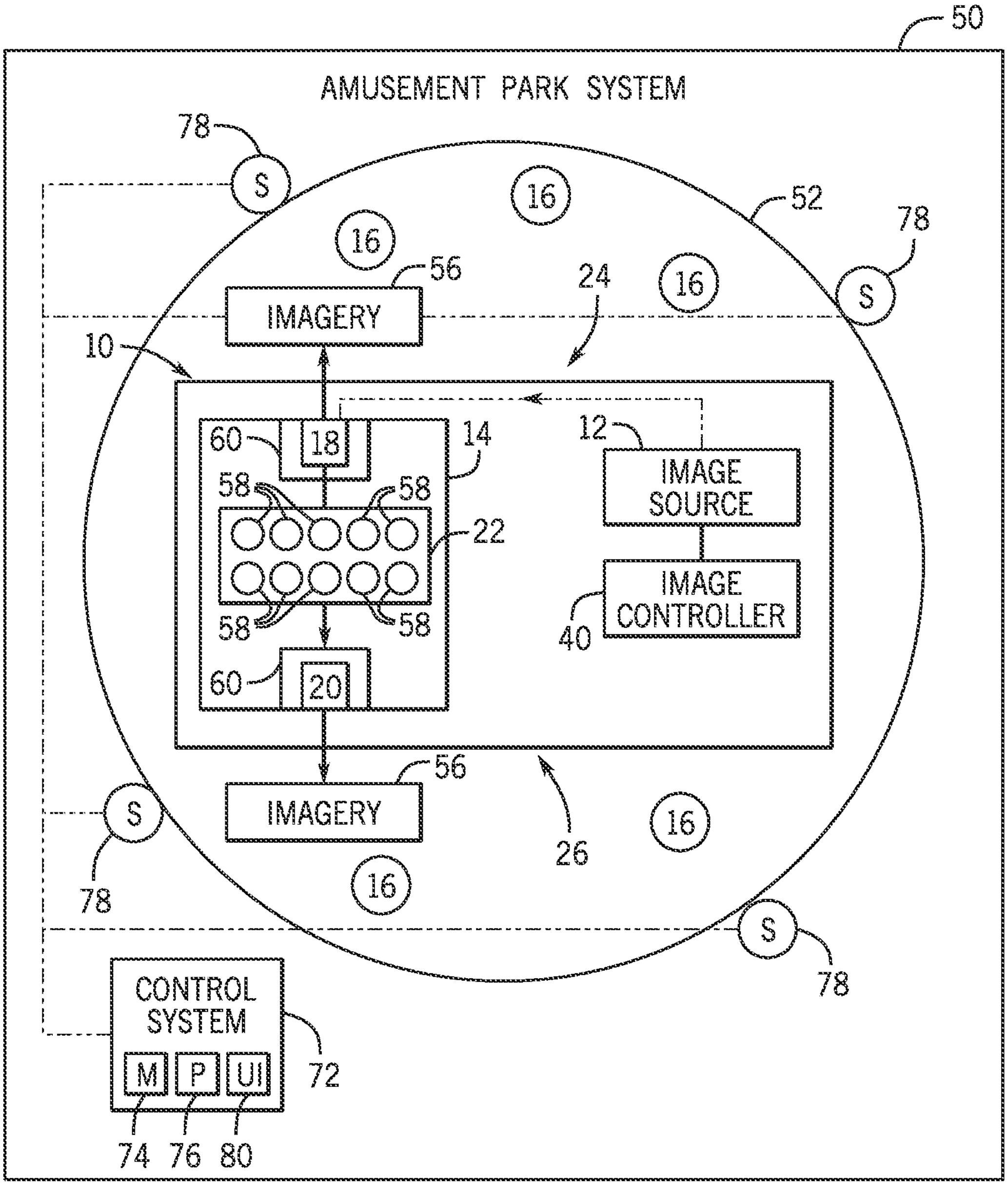
FIG. 2 is schematic diagram of an embodiment of a show effect system operable to present imagery, in accordance with an aspect of the present disclosure.

FIG. 2 is a schematic diagram of an embodiment of an amusement park system 50, which may be representative of any venue that would benefit from entertainment (e.g., an attraction, an entertainment area, a walkway, a theater, a restaurant, a waiting room), that employs the DSPS 10 to present imagery to guests of the amusement park system 50. As an example, the amusement park system 50 may be a part of an attraction system, such as a ride (e.g., a roller coaster, a dark ride), a performance show, and the like. As another example, the amusement park system 50 may be a part of a dining venue, a waiting area, a walkway, a shopping venue (e.g., a gift shop), or any other suitable part of an amusement park. The amusement park system 50 may therefore include a guest area 52 where guests may be located. For instance, the guest area 52 may include a ride vehicle, a pathway (e.g., a queue), seating, or any other suitable feature that accommodates guests within the amusement park system 50.

The amusement park system 50 may utilize the DSPS 10 to provide certain effects (e.g., visual effects) to the guests 16 of the guest area 52. For example, operation of the DSPS 10 may present imagery 56 that becomes visible to the guests 16 at certain times. The imagery 56 may be presented via each of the display surfaces 18, 20 of the display 14, thereby enabling guests 16 within the guest area 52 and positioned at different locations and/or viewing angles relative to the display surfaces 18, 20 to be presented with the imagery 56. For example, the imagery 56 may be projected via the image source 12 onto the first display surface 18, and the light transmission system 22 may transmit the projected imagery 56 (e.g., transmit light associated with the projected imagery 56) therethrough such that the imagery 56 is also visible on the second display surface 20.

For example, the light transmission system 22 may include multiple light transmitters 58 (e.g., light pipes, light tubes, fiber optics) positioned between (e.g., extending between) the first display surface 18 and the second display surface 20 and each of the light transmitters 58 may be configured to transmit light therethrough. In certain embodiments, each of the light transmitters 58 may include a first end associated with the first display surface 18, a second end associated with the second display surface 20, and a body extending between the first end and the second end, as discussed in greater detail below. For example, the first end of a respective light transmitter 58 may terminate at the first display surface 18, the body may extend through the light transmission system 22 and between the first and second display surfaces 18, 20, and a second end of the respective light transmitter may terminate at the second display surface 20. Thus, upon projecting the imagery 56 onto the first display surface 18, which reflects the imagery 56 as a traditional projection surface, the first end of the light transmitters 58 may also receive the light associated with the projected imagery 56 and the body of a respective light transmitter 58 may transmit the light therethrough to the second end of the respective light transmitter 58 such that the imagery 56 may be presented via the second display surface 20. In certain embodiments, each of the light transmitters 58 may be configured to provide total or near total internal reflection such that light directed through a light transmitter 58 passes through the light transmitter 58 and is emitted at the other end while minimizing an amount of light lost during transmission.

In certain embodiments, each of the display surfaces 18, 20 may be a component of a projection surface assembly 60 formed from one or more layers. The layers may include a projection layer and/or a glass layer. The projection layer may be disposed such that the projected imagery 56 from the image source 12 is projected onto the projection layer. As such, in certain embodiments, the projection layer may correspond to the display surfaces 18, 20 and may be disposed nearest the image source 12 relative to other layers of the projection surface assembly 60. In certain embodiments, the material of the projection layer may incorporate an optical characteristic (e.g., tinting, color, texture). For example, the material of the projection layer may be a semi-opaque and/or tinted material that is tinted with a color, such as a dark color (e.g., black, gray, dark blue, dark green), to reduce its light transmission. The darkness of the tint is a trade-off between the contrast that the final image will have (darker tint) and the raw brightness of the projector to achieve the same final image brightness. In certain embodiments, the projection layer is tinted with a film or additional layer applied to the display surfaces 18, 20. In other embodiments, the projection layer is dyed with, impregnated with, or includes a pigment (e.g., metal oxides) distributed throughout the material to form the tint. Further, the materials of the component layers of the projection surface assemblies 60 may be at least partially opaque or may reduce light transmission without any tinting. In some embodiments, the projection layer may be textured to achieve desired transmission and/or reflection characteristics. While specific optical characteristics may be disclosed as examples in the present disclosure, it should be understood that other optical characteristics may be incorporated instead of or in addition to those described.

As discussed herein, the material of the projection layer may be dark-tinted. In certain embodiments, the tint of the projection layer may be related to the semi-opaque quality of the projection layer. The tint of the projection layer may allow for deep black, as well as bright colors, in the image or image sequence projected onto one of the display surfaces 18, 20 by the image source 12. In certain embodiments, the projection layer may be tinted over an entire surface of the projection layer. In some embodiments, in which the projected imagery presents an animation, the projection layer may only be tinted in areas of the display surfaces 18, 20 where the image or image sequence is animated. For example, if the image or image sequence projected onto one of the display surfaces 18, 20 contains animation in only some areas of the image, the projection layer may only be tinted in that portion of the display surface 18, 20. For areas of the display surface 18, 20 in which the image remains static, in some embodiments, the projection layer may not be tinted in those static areas. That is, the tint may only be present on the projection layer where the image or image sequence will present animation to the guests 16.

In certain embodiments, the projection layer may be made of an acrylic or plastic material. Additionally, the projection layer may be made from material with a matte quality that ranges from fully matte to fully glossy (e.g., little to no matte quality). For example, the projection layer may be made from a cell-cast acrylic, such as P95, having a matte finish. In other embodiments, the projection layer may be made from any material with light diffusing properties to increase the immersive experience of guests viewing the display 14 of the DSPS 10. Additionally, in certain embodiments, the projection surface assembly 60 may include a liquid crystal display (LCD) layer that may be used to enhance the certain colors in the imagery 56 presented to the guests 16. The LCD layer may be a transparent LCD driven by a controller of the DSPS 10 to show or enhance certain colors in the projected imagery 56.

In certain embodiments, the light transmission system 22 may be configured and/or oriented such that each of the first and second ends of a respective light transmitter 58 terminate at a desired location on the respective display surface 18, 20 associated with the first or second end of the light transmitter 58. For example, as noted above, a first light transmitter 58 of the light transmission system may have a first end positioned proximate an upper left corner of the first display surface 18 (e.g., relative to the first viewing side 24). The body of the first light transmitter 58 may extend through the light transmission system 22 such that a second end of the first light transmitter 58 that is associated with the second display surface 20 may be positioned proximate an upper left corner of the second display surface 20 (e.g., relative to the second viewing side 26). That is, the body of each of the light transmitters 58 employed by the light transmission system 22 may be woven through and/or directed through the light transmission system 22 such that imagery projected onto the first display surface 18 is manipulated (e.g., rotated, flipped, change in size, change in intensity) in a desirable manner before being presented on the second display surface 20 (e.g., via the second end of the light transmitters 58). In this way, guests 16 positioned on the second viewing side 26 associated with the second display surface 20 may view the desirable imagery 56 (e.g., same imagery that is projected onto the first display surface 18, imagery having a proper orientation, imagery that is not mirrored) that is projected onto the first display surface 18 as though the imagery 56 is projected onto the second display surface 20.

For example, imagery 56 that includes a text image of "HELLO" may be projected onto the first display surface 18 such that the word "HELLO" may be presented in a legible manner (e.g., may be oriented from left to right) to guests 16 positioned on the first viewing side 24. The first ends of the light transmitters 58 positioned proximate the first display surface 18 may receive the light associated with the projected imagery and may direct the light through the bodies and toward the second end of the light transmitters 58 such that the text image may be viewable by viewers positioned on the second viewing side 26. However, because the bodies of the light transmitters 58 are woven between the first and second display surfaces 18, 20, the word "HELLO" may appear on the second display surface 20 in a legible manner (e.g., oriented from left to right) to viewers positioned on the second viewing side 26. That is, the arrangement of the light transmitters 58 of the light transmission system 22 may cause the projected imagery to be flipped horizontally such that the imagery is presented in a desirable (e.g., legible, perceivable) manner. In certain embodiments, the light transmission system 22 may adjust, alter, and/or modify the projected image such that different imagery 56 (e.g., modified imagery) is presented on each of the display surfaces 18, 20 employed by the DSPS 10, as discussed in greater detail below.

In certain embodiments, a control system 72 (e.g., an automation controller, a programmable controller, an electronic controller) that is a part of or communicatively coupled to the DSPS 10 may be configured to control aspects of the DSPS 10 (e.g., the image source 12, the image controller 40, the display 14, the light transmission system 22) to adjust the imagery 56 being presented. The control system 72 may include a memory 74 and processing circuitry 76. The memory 74 may include volatile memory, such as random-access memory (RAM), and/or non-volatile memory, such as read-only memory (ROM), optical drives, hard disc drives, solid-state drives, or any other non-transitory computer-readable medium that includes instructions to operate the DSPS 10. The processing circuitry 76 may be configured to execute such instructions. For example, the processing circuitry 76 may include one or more application specific integrated circuits (ASICs), one or more field programmable gate arrays (FPGAs), one or more general purpose processors, or any combination thereof.

For example, the control system 72 may be configured to operate the image source 12 to output imagery 56 toward the display 14 (e.g., toward a display surface 18, 20 of the display 14). Additionally or alternatively, the control system 72 may be configured to operate the light transmission system 22 to output light or to block output of light. Adjusting the output of light via the light transmission system 22 may enable or block presentation of the imagery 56 and/or adjust an appearance of the imagery 56. In certain embodiments, the control system 72 may operate the DSPS 10 based on data received from a sensor 78. For instance, the sensor 78 may determine a parameter associated with the guest area 52. As an example, the parameter may include a location and/or position of guests 16 in the guest area 52 (e.g., viewpoint relative to the first display surface 18 and/or the second display surface 20). The control system 72 may receive the data indicative of a location and/or position of the guests 16 and may operate the image source 12 to output imagery 56 corresponding to a map of each of the guest's location within the guest area 52. The map may be projected onto the first display surface 18 such that guests 16 positioned on the first viewing side 24 may observe indications of location of other guests 16 within the viewing area 52 in a proper orientation from their perspective. Meanwhile, the projected imagery may be directed through the light transmission system 22 such that the map is inverted when presented on the second viewing surface 20 and in a proper orientation for an associated viewing perspective.

As another example, the parameter may correspond to a distance and/or a position of a guest and/or multiple guests, such as relative to the display 14. The control system 72 may receive the data indicative of the position of the guest(s) and operate the image source 12 to output light in response to determining the position of the guest is within a threshold distance of a display surface 18, 20 of the display 14. As a further example, the sensor 78 may include a reader configured to receive an input or a signal transmitted by a device (e.g., a mobile device, a wristband, a headset) of the guest, and receipt of the input may cause the sensor 78 to transmit a data signal to the control system 72 to cause the control system 72 to operate the image source 12. The control system 72 may further operate the image source 12 based on any other suitable parameter, such as a time of day, a time of operation of the DSPS 10, a level of ambient light surrounding the DSPS 10, and the like. Operation of the control system 72 based on the sensor 78 may enable the control system 72 to operate the DSPS 10 automatically (e.g., without receipt of a user input).

The control system 72 may further include a user interface (UI) 80 with which a user, such as an operator of the DSPS 10 and/or a guest of the guest area 52, may interact. The control system 72 may operate the image source 12 based on the interaction with the UI 80. For example, the interaction with the UI 80 may indicate a request to adjust presentation of the imagery 56, and the control system 72 may operate the image source 12 (and/or the image controller 40) accordingly. Thus, the UI 80 may enable more customizable operation of the control system 72 to operate the DSPS 10.

Figure 3:
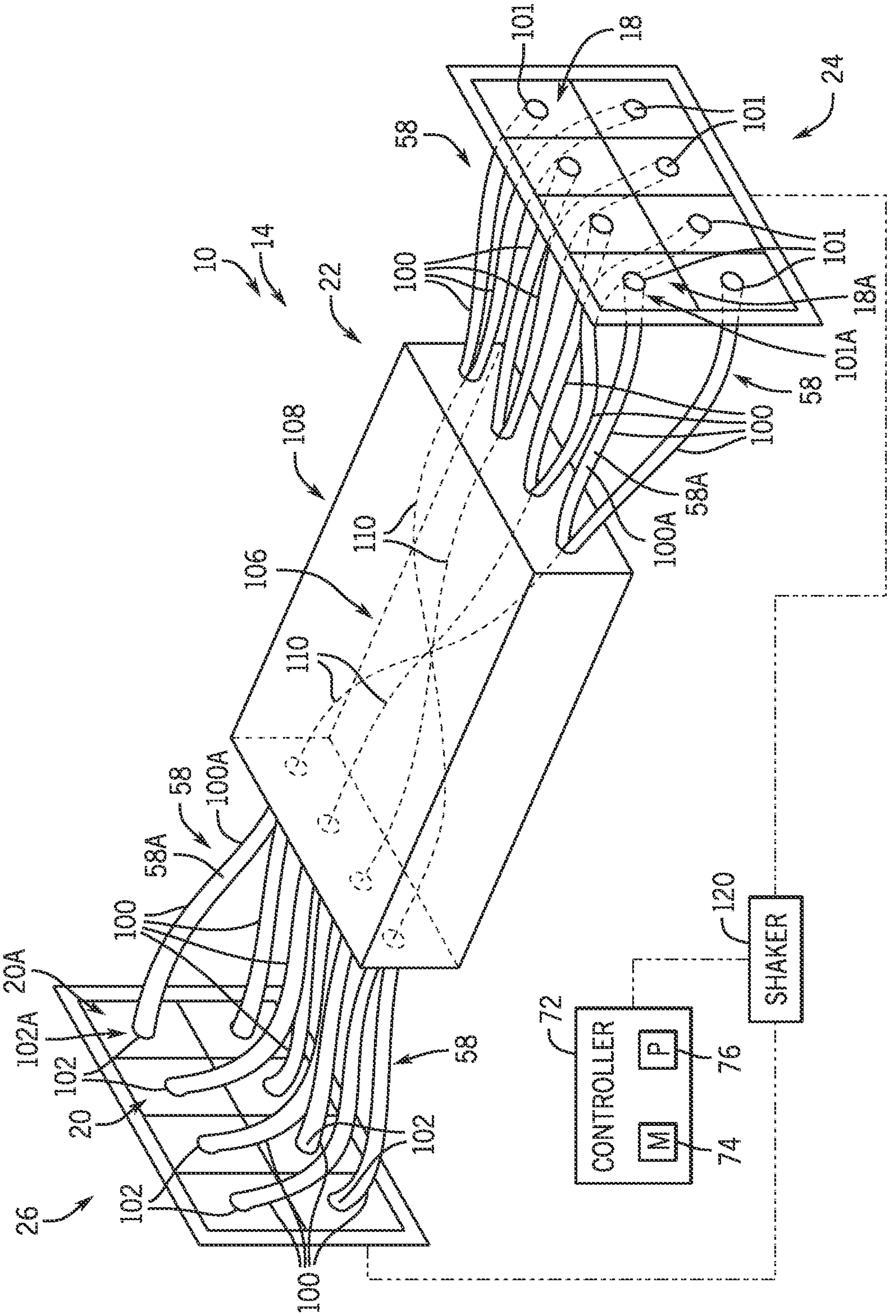
FIG. 3 is a schematic perspective view of an embodiment of a show effect system operable to present imagery, in accordance with an aspect of the present disclosure.

FIG. 3 is an exploded perspective view of an embodiment of the light transmission system 22 of the DSPS 10 of FIG. 1. In the illustrated embodiment, multiple light transmitters 58 of the light transmission system 22 are shown extending between the first display surface 18 and the second display surface 20 of the display 14 of the DSPS 10. For example, each of the light transmitters 58 may include a body 100 having a first end 101 associated with (e.g., positioned proximate to, terminating at) the first display surface 18 and a second end 102 associated with (e.g., positioned proximate to, terminating at) the second display surface 20. As noted above, during operation of the DSPS 10, the image source 12 may project imagery 56 onto either the first display surface 18 or the second display surface 20, and the light transmitters 58 of the light transmission system 22 may transmit the light projected onto either the first display surface 18 or the second display surface 20 such that the imagery 56 may be presented on the display surface 18, 20 that does not directly receive the projected imagery 56. Thus, present embodiments provide both a reflecting surface (the display surface receiving the projected imagery 56 and at least partially reflecting light from the projected imagery 56) and a transmitting surface (the display surface emitting the light from the projected imagery 56 that is received into and transmitted through the transmission system 22).

In certain embodiments, the light transmitters 58 of the light transmission system may be arranged in a woven arrangement 106 configured to enable each of the display surfaces 18, 20 employed by the DSPS 10 to provide desired imagery. For example, the woven arrangement 106 may enable imagery that is projected onto the first display surface 18 to be modified, flipped, rotated, and/or altered in a desired manner to present desirable imagery on the second display surface 20. That is, the woven arrangement 106 may be configured to position an end of a respective tube at a particular location (e.g., desired location) relative to the display surface associated with the particular end. In this way, a location of a first end 101 of a light transmitter 58 relative to the first viewing side 24 may be the same as a location of a second end 102 of the light transmitter 58 relative to the second viewing side 26. For example, in the illustrated embodiment, a first light transmitter 58A includes a first end 101A that is positioned in an upper left portion 18A of the first display surface 18 (e.g., relative to the first viewing side 24) and a second end 102A that is positioned in an upper left portion 20A of the second display surface 20 (e.g., relative to the second viewing side 26). Thus, as imagery is projected onto the upper left portion 18A of the first display surface 18 (e.g., via the image source 12), the light associated with the imagery may be received by the first end 101A of the light transmitter 58A and directed through the body 100A of the light transmitter 58A until reaching the second end 102A of the light transmitter 58A. However, because the body 100A of the light transmitter 58A extends through the woven arrangement 106, the second end 102A of the light transmitter 58A may present the imagery in the upper left portion 20A of the second display surface 20 (e.g., relative to the second viewing side 26). In this way, the imagery projected onto the first display surface 18 may be flipped horizontally.

In certain embodiments, the light transmission system 22 may also include a support assembly 108 configured to provide support for the woven arrangement 106 of the light transmitters 58. For example, the support assembly 108 may be a housing or structure configured to receive and support one or more of the light transmitters 58 employed by the DSPS 10. In certain embodiments, the support assembly 108 may define multiple channels 110 configured to direct one or more bodies 100 of the light transmitters 58 therethrough. For example, in the illustrated embodiment, the support assembly includes four channels 110, and each of the channels 110 is configured to support and/or receive two light transmitters 58 (e.g., an upper light transmitter 58 and a lower light transmitter 58). In certain embodiments, the channels 110 may be machined through the support assembly 108 to provide support for the various light transmitters 58 extending therethrough. Further, the channels 110 of the support assembly 108 may be configured to achieve the woven arrangement 106 of the light transmitters 58. That is, the channels 110 may extend through the support assembly 108 in a configuration that enables a desired positioning of each end 101, 102 of a light transmitter 58 relative to a respective display surface 18, 20 associated with the particular end 101, 102.

It should be appreciated that while the illustrated embodiment shows eight light transmitters 58, four channels 110, and two light transmitters 58 associated with each channel 110, the DSPS 10 discussed herein may employ more or fewer light transmitters 58, more or fewer channels 110, and/or different arrangements between the light transmitters 58 and the channels 110. For example, in certain embodiments, tens, hundreds, or thousands of light transmitters 58 may be utilized to provide the desired imagery on each display surface 18, 20, and each light transmitter 58 may be associated with a single channel 110. Additionally, while the discussion above provides an example in which imagery projected onto an upper left portion 18A of the first display surface 18 (e.g., relative to the first viewing side 24) is displayed in an upper left portion 20A of the second display surface (e.g., relative to the second viewing side 26), this example (in which the projected imagery is flipped horizontally) is not intended to be limiting. For example, in other embodiments, the support assembly 108 and/or the woven arrangement 106 may cause imagery projected onto the first display surface 18 to be flipped vertically and/or modified in another manner to provide desirable imagery on the second display surface 20.

As another example, the support assembly 108 and/or the woven arrangement 106 may be configured to guide the bodies 100 of the light transmitters 58 therethrough such that imagery projected onto the first display surface 18 and received by the first ends 101 of the light transmitters 58 may be rotated by a particular magnitude (e.g., 90 degrees, 180 degrees) before being presented onto the second display surface 20 via the second ends 102 of the light transmitters 58. As yet another example, the support assembly 108 and/or the woven arrangement 106 may cause a scale and/or density of the projected imagery to change. For example, in certain embodiments, each of the first ends 101 of the light transmitters 58 may be spaced apart from one another by a first distance, and each of the second ends 102 of the light transmitters 58 may be spaced apart from one another by a second distance. In certain embodiments, the first distance may be greater than the second distance such that imagery projected onto the first display surface 18 appears larger on the first display surface 18 and/or has a lesser density relative to the imagery that is presented on the second display surface 20 (e.g., due to the second ends 102 of the light transmitters 58 being closer to one another).

Further still, the support assembly 108 and/or the woven arrangement 106 may enable imagery projected onto the first display surface 18 to change shape. For example, the first ends 101 of the light transmitters 58 may be arranged in a square shape and the second ends 102 of the light transmitters 58 may be arranged in a circular shape. Thus, as imagery is projected onto the first display surface 18, the imagery may be presented in a square shape. However, because the second ends 102 of the light transmitters 58 are arranged in a circular shape, as the light associated with the projected imagery passes through the bodies 100 of the light transmitters 58 toward the second ends 102, the second display surface 20 may present the imagery in a circular shape. As another example, in certain embodiments, guests 16 may be provided with or may supply themselves image sources 12 (e.g., projectors) that they can employ to project imagery onto one of the surfaces 18, 20 of the display 14, and the light transmission system 22 may translate the imagery into different imagery on a different surface of the display 14. For example, a guest 16 may project an image of a cat onto the first display surface 18 and the first display surface 18 may reflect the imagery of the cat toward guests 16 on the first viewing side 24. Meanwhile, first ends 101 of the light transmitters 58 of the light transmission system 22 may receive the light associated with the projected imagery, direct the light therethrough (e.g., direct the light through the bodies 100 of the light transmitters 58), and present the light through the second display surface 20 (e.g., via the second ends 102 of the light transmitters 58). However, the second ends 102 of the light transmitters 58 may be arranged in a shape of a dog such that the projected imagery of the cat is translated into imagery of a dog via the light transmission system 22. In this way, present embodiments may not only function to display image data but may also serve as a source of entertainment for guests 16 that may be surprised to see, for example, an image of a cat translated into an image of a dog on a different display surface of the display 14. It should be appreciated that in certain embodiments, the DSPS 10 may alter, modify, flip, and/or rotate projected imagery using any combination of the above examples. For example, in certain embodiments, the woven arrangement 106 and/or the support assembly 108 may cause imagery projected onto the first display surface 18 to be flipped horizontally, to be decreased in size, and/or to change shape, as desired.

Additionally, in certain embodiments, a respective end 101, 102 of a light transmitter 58 may be split between one or more pixels of a display surface 18, 20. For example, each display surface 18, 20 may include 100 pixels. However, the light transmission system 22 may only employ fifty light transmitters 58. Accordingly, in certain embodiments, respective ends 101, 102 of a light transmitter 58 may be split across two pixels such that each pixel employed by a respective display surface 18, 20 is associated with at least one end (e.g., split end) of a light transmitter 58. Further still, in certain embodiments, a shaker 120 may employed by the DSPS 10 to provide a temporal super resolution of certain imagery projected onto the display 14. For example, the shaker 120 may be coupled to the first display surface 18 and the second display surface 20 and may be configured to shake or vibrate the display surfaces 18, 20 by a threshold amount such that a persistence of vision is achieved on each of the display surfaces 18, 20. For example, consider a scenario in which each of the display surfaces 18, 20 is arranged in a ten-pixel by ten-pixel arrangement. In certain embodiments, one hundred light transmitters 58 may be employed such that each pixel is associated with a corresponding light transmitter 58. However, in other embodiments, only fifty light transmitters 58 may be employed, and the shaker 120 may be configured to shake and/or vibrate each of the display surfaces 18, 20 such that a single light transmitter 58 is shared amongst multiple pixels. In this way, persistence of vision may be achieved, thereby improving an experience of a guest viewing the display 14 of the DSPS 10. In certain embodiments, the shaker 120 may be communicatively coupled to the controller 72, thereby enabling the controller 72 to control operation of the shaker 120 based on certain conditions (e.g., based on sensor data from the sensors 78). It should be noted that present embodiments may include various ratios of pixels to light transmitters 58, including 1:1 or ratios where there are multiple light transmitters 58 (and corresponding ends thereof) cooperating to light up a single pixel.

Figure 4:
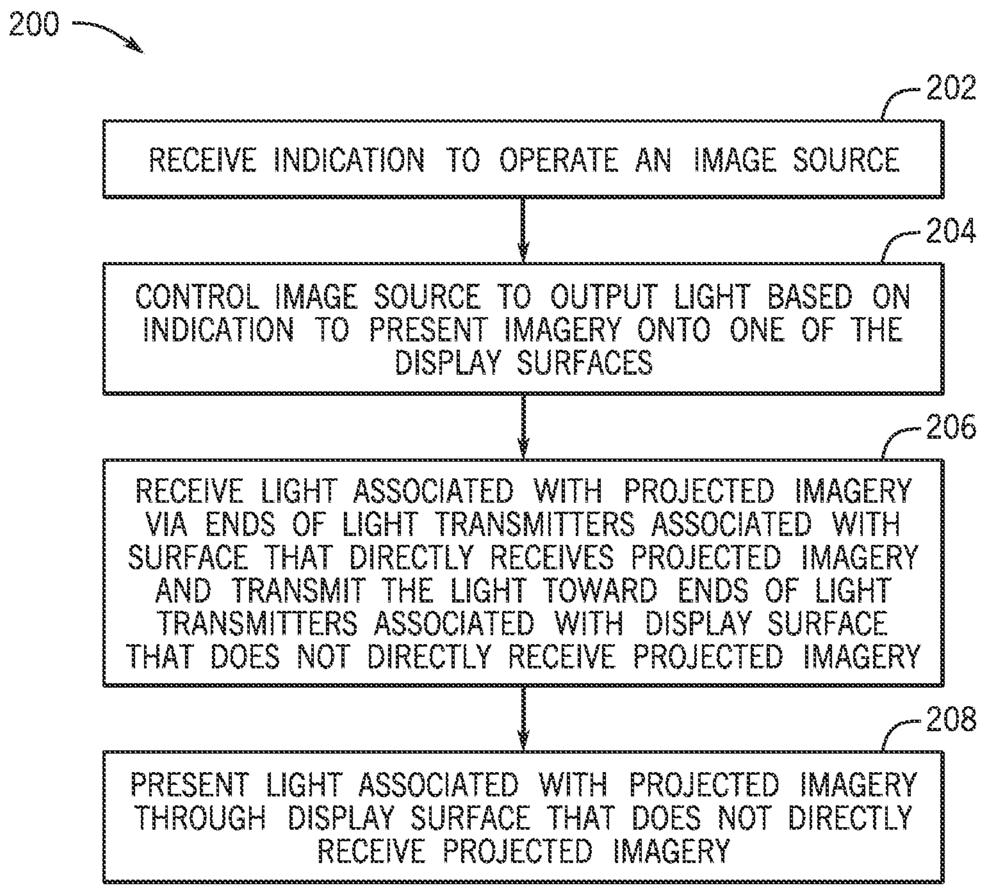
FIG. 4 is a flowchart of an embodiment of a method or process for operating a show effect system to present imagery, in accordance with an aspect of the present disclosure.

FIG. 4 is a flowchart of an embodiment of a method or process 200 for operating the DSPS 10 described herein. The method 200 may be performed by a single component or system, such as by the control system 72 (e.g., the processing circuitry 76). In additional or alternative embodiments, multiple components or systems may perform the operations of the method 200. It should also be noted that additional operations may be performed with respect to the described method 200. Furthermore, certain operations of the depicted method 200 may be modified.

At block 202, an indication to operate an image source (e.g., image source 12) may be received. As an example, the indication may include data indicative of a parameter. For instance, the parameter may include a position of a guest relative to a component of the DSPS 10 (e.g., display surface 18, display surface 20), a quantity of guests proximate a component of the DSPS 10, a time of operation, a time of day, another suitable parameter, or any combination thereof. The parameter may be received from a sensor. In certain embodiments, the indication may include a signal received from a reader. The reader may be configured to transmit the signal in response to receiving an input from a device, such as a device of the guest. As another example, the indication may include a user input received via a user interaction, such as with the UI 80 of the controller 72 of the DSPS 10.

At block 204, the image source (e.g., image source 12) may be operated to output light (e.g., output imagery) based on the indication to present imagery. For example, in response to receiving the indication, the image source may project the imagery onto one of the display surfaces 18, 20 employed by the display 14 of the DSPS 10. At block 206, the ends of the light transmitters 58 associated with the display surface 18, 20 that directly receives the projected imagery may receive the light associated with the projected imagery and direct the light toward the second ends of the light transmitters associated with the display surface 18, 20 that does not directly receive the projected imagery. In this way, at block 208, light associated with imagery that is projected onto one of the display surfaces 18, 20 may be passed through the light transmitters 58 and may be presented through the display surface 18, 20 that does not directly receive the projected imagery.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A projection system for an entertainment venue, the projection system comprising:

a display having a first display surface and a second display surface, wherein the first display surface is associated with a first viewing side and the second display surface is associated with a second viewing side;

a light transmission system comprising a plurality of light transmitters extending between the first display surface and the second display surface, wherein the plurality of light transmitters is arranged in a woven arrangement; and an image source configured to project imagery onto the first display surface, wherein the first display surface comprises a surface treatment configured to reflect a first portion of light from the imagery for presentation to the first viewing side associated with the first display surface, each of the plurality of light transmitters is configured to direct a second portion of the light from the imagery projected onto the first display surface to the second display surface for presentation to the second viewing side associated with the second display surface, and the light transmission system is configured to modify an orientation of the imagery projected onto and reflected by the first display surface before presenting the imagery through the second display surface via the woven arrangement.

2. The projection system of claim 1, wherein each light transmitter of the plurality of light transmitters comprises a first end positioned adjacent the first display surface, a second end positioned adjacent the second display surface, and a body extending through and at least partially defining the woven arrangement between the first end and the second end.

3. The projection system of claim 1, wherein the image source is a projector.

4. The projection system of claim 1, wherein the woven arrangement enables the light transmission system to emit different imagery from the second display surface than the imagery reflected from the first display surface.

5. The projection system of claim 1, wherein each light transmitter of the plurality of light transmitters is a fiber optic cable or an acrylic light tube.

6. The projection system of claim 1, comprising a support assembly positioned between the first display surface and the second display surface, wherein the support assembly is configured to provide support for each light transmitter of the plurality of light transmitters of the light transmission system, the support assembly defines a plurality of channels, and each channel of the plurality of channels is configured to receive one or more light transmitters of the plurality of light transmitters and direct the one or more light transmitters of the plurality of light transmitters therethrough.

7. The projection system of claim 1, wherein the plurality of light transmitters of the light transmission system is arranged in the woven arrangement such that the imagery projected onto the first display surface and transmitted through the light transmission system is flipped horizontally before being presented through the second display surface.

8. The projection system of claim 1, wherein the light transmission system is configured to modify a size, a shape, an intensity, or any combination thereof of the imagery projected onto the first display surface before presenting the imagery through the second display surface.

9. The projection system of claim 1, comprising:

one or more sensors configured to collect data indicative of one or more parameters of a guest area in which the projection system is disposed; and a controller communicatively coupled to the one or more sensors and configured to operate the projection system based on the data from the one or more sensors.

10. A system for an amusement park, the system comprising:

a projector configured to project imagery;

a first display surface configured to receive the imagery projected by the projector, wherein the first display surface comprises a surface treatment configured to at least partially reflect the imagery for presentation to a first viewing side associated with the first display surface;

a second display surface; and a plurality of light transmitters extending between the first display surface and the second display surface and arranged in a woven arrangement, wherein the plurality of light transmitters is configured to modify an orientation of the imagery projected onto and at least partially reflected by the first display surface via the woven arrangement before presenting the imagery through the second display surface, and wherein each light transmitter of the plurality of light transmitters comprises:

a first end positioned proximate the first display surface;

a second end positioned proximate the second display surface; and a body extending between the first end and the second end, wherein the first end is configured to receive light associated with the imagery projected onto and at least partially reflected by the first display surface, the body is configured to direct the light toward the second end, the second end is configured to present the light via the second display surface to a second viewing side associated with the second display surface, and respective bodies of at least two light transmitters of the plurality of light transmitters cross one another between the first display surface and the second display surface to at least partially form the woven arrangement.

11. The system of claim 10, wherein the woven arrangement is configured to:

position the first end of a respective light transmitter of the plurality of light transmitters at a first position relative to the first viewing side, wherein the first viewing side is associated with a first plurality of guests; and position the second end of the respective light transmitter of the plurality of light transmitters at a second position relative to the second viewing side, wherein the second viewing side is associated with a second plurality of guests, and wherein the first position relative to the first viewing side corresponds to the second position relative to the second viewing side.

12. The system of claim 10, wherein the first end of each light transmitter of the plurality of light transmitters is spaced a first distance apart from one another, the second end of each light transmitter of the plurality of light transmitters is spaced a second distance apart from one another, and the first distance is greater than the second distance.

13. The system of claim 10, wherein the first ends of the plurality of light transmitters are collectively arranged with one another to collectively define a first shape associated with the first display surface, the second ends of the plurality of light transmitters are collectively arranged with one another to collectively define a second shape associated with the second display surface, and the first shape is different than the second shape.

14. A multi-sided projection system for an amusement park, the multi-sided projection system comprising:

a display positioned within a guest area and comprising:

a first display surface configured to present imagery to a first viewing side;

a second display surface configured to present the imagery to a second viewing side; and a plurality of light transmitters extending between the first display surface and the second display surface and arranged in a woven arrangement, wherein the plurality of light transmitters is configured to transmit light received via the first display surface out of the second display surface and to modify an orientation of the imagery received via the first display surface before presenting the imagery through the second display surface;

an image source configured to project the imagery onto the first display surface, wherein the first display surface comprises a surface treatment configured to reflect a portion of the imagery projected onto the first display surface for presentation to the first viewing side;

one or more sensors configured to detect data indicative of one or more parameters of the guest area; and a controller configured to control the display to change the imagery based on the data from the one or more sensors.

15. The multi-sided projection system of claim 14, wherein the one or more parameters comprise a respective location of one or more guests positioned within the guest area, and wherein the controller is configured to control the operation of the display based on the respective location of each of the one or more guests.

16. The multi-sided projection system of claim 14, comprising a shaker communicatively coupled to the controller and to the first display surface and the second display surface, wherein the controller is configured to operate the shaker to shake the first display surface and the second display surface based on the data from the one or more sensors.

17. The multi-sided projection system of claim 14, wherein the plurality of light transmitters is configured to direct light associated with the imagery projected onto the first display surface to the second display surface via the woven arrangement such that the imagery projected onto the first display surface is not mirrored when presented on the second display surface.

18. The multi-sided projection system of claim 14, comprising an image controller communicatively coupled to the controller and to the image source, wherein the image controller is configured to render the imagery projected onto the first display surface.

19. The projection system of claim 1, wherein the woven arrangement is configured to cause respective bodies of at least two light transmitters of the plurality of light transmitters to cross one another between the first display surface and the second display surface.

20. The projection system of claim 1, wherein the surface treatment comprises a semi-opaque material or a tinted material that is configured to reduce light transmission.

* * * * *